Nov. 2, 1965 H. WEISS Re. 25,891

FLUORESCENT LAMP

Original Filed Sept. 6, 1962

INVENTOR.
HARRY WEISS

BY James and Franklin

ATTORNEYS

United States Patent Office

Re. 25,891
Reissued Nov. 2, 1965

25,891
FLUORESCENT LAMP

Harry Weiss, 61 Carleon Ave., Larchmont, N.Y.

Original No. 3,179,792, dated Apr. 20, 1965, Ser. No. 221,716, Sept. 6, 1962. Application for reissue July 2, 1965, Ser. No. 469,979
5 Claims. (Cl. 240—11.4)

Matter enclosed in heavy brackets [ ] appears in the original patent but forms no part of this reissue specification; matter printed in italics indicates the additions made by reissue.

This invention relates to fluorescent lamps, and more particularly to a reflective lamp suitable for outdoor use.

The primary object of the invention is to generally improve fluorescent lamps. More particular objects are to protect a fluorescent lamp against low ambient temperature, typically for outdoor use in winter; to provide a reflector for the lamp; and to combine the parts structurally so that a single simple assembly will both protect the lamp and reflect its illumination. A still further object is to provide a construction which is readily applicable to fluorescent lamps of standard or conventional construction.

To accomplish the foregoing general objects and other more specific objects which will hereinafter appear, my invention resides in the assembly elements and their relation one to another as are hereinafter more particularly described in the following specification. The specification is accompanied by a drawing in which.

Figure 1:
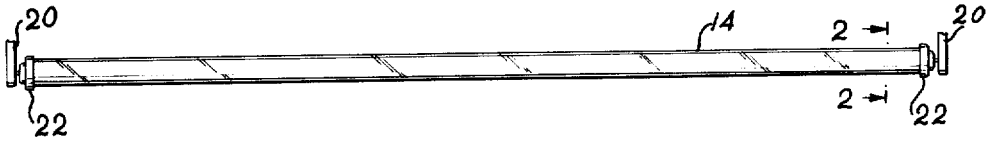
FIG. 1 shows a jacketed reflective fluorescent lamp assembly embodying features of the invention.

Referring to the drawing, the assembly comprises a fluorescent lamp 12, a glass cylinder 14 of larger diameter around the lamp to jacket the same, and a reflective coating 16 on the inside of the jacket 14 for part of the periphery of the jacket, so that the jacket acts also as a reflector.

Figure 2:
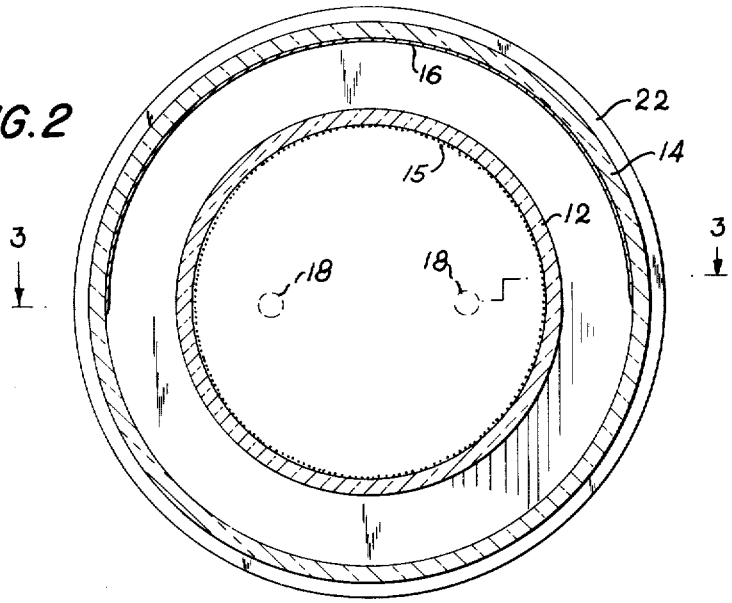
FIG. 2 is a section drawn to enlarged scale, and taken approximately in the plane of the line 2—2 of FIG. 1.
Figure 3:
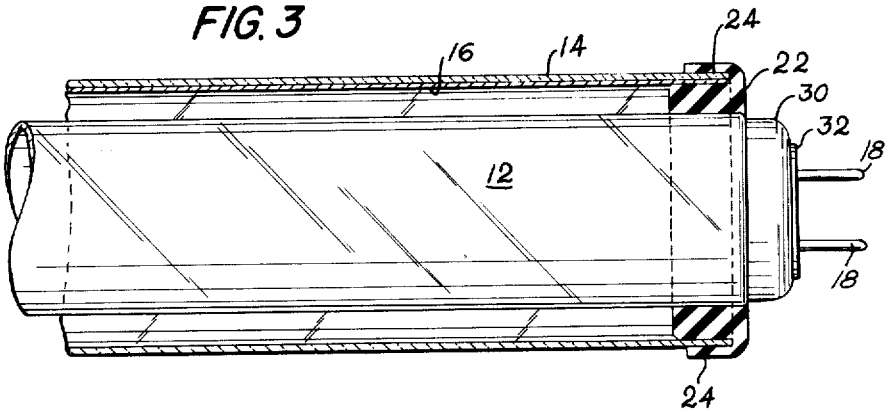
FIG. 3 is a fragmentary longitudinal section, taken approximately in the plane of the line 3—3 of FIG. 2.

The lamp 12 may be of conventional construction including end pins 18 for support of and electrical connection to the lamp. The pins are received in conventional sockets, parts of which are indicated at 20 in FIG. 1. There are sealing rings 22 which are made of a yieldable resilient material having the characteristics of rubber, there being one such ring applied frictionally over each end of the lamp. The rings 22 are annularly recessed, as shown at 24 in FIG. 3, to receive and to close the ends of the jacket 14. These rings further hold the jacket in coaxial relation with the lamp 12. The reflective coating 16 is preferably a white pigment coated on the inside of the jacket 14 for a part of the periphery of the jacket, say half the periphery, as shown in FIG. 2.

The lamp 12 in the present case has dished aluminum ends or caps 30 which are cemented to the ends of the glass envelope of the lamp, and which themselves carry phenolic insulation 32 for the terminal pins 18. The inside diameter of the rings 22 is selected to be received with a snug frictional fit over the ends of the lamp 12.

In a typical case the lamp 12 has an outside diameter of 1½ inches and the jacket 14 an outside diameter of 2⅛ inches. The wall thickness of the jacket is about 1 to 1.5 millimeters, leaving a jacket space of about ¼ inch around the lamp. These dimensions are given as an example, and are not intended to be in limitation of the invention.

The envelope of lamp 12 has the usual fluorescent coating 15 on its inside wall. The reflective coating 16 may be a film of any good light reflecting paint. Such a paint may be fabricated by milling titanium or zirconium oxide in a pebble mill together with nitrocellulose, the powder being carried in a suitable vehicle or solvent.

It will be seen from the foregoing description that the sealing rings 22 and the jacket 14 may be applied to standard or conventional fluorescent lamps, so that the complete reflective and jacketed assembly may be made at minimum cost. Moreover, the assembly may be mounted in and carried by standard sockets, which again contributes to low cost.

One advantage of the illustrated assembly is that the direction of reflection may be altered as needed. In most cases a fluorescent lamp is mounted with its pins in a horizontal plane, and assuming that downward reflection is wanted, the reflecting surface of the jacket is disposed at the top or above the plane of the pins. However, in some special situation it may be desired to reflect the light in some other direction relative to the pins, and in such case it is merely necessary to twist the lamp within the end seals, or alternatively, to turn the jacket relative to the end seals, thereby changing the direction of reflection.

Another advantage of the present construction is that the reflector is sealed at the ends and therefore remains clean. It retains its white color and its reflection efficiency over a long period of use. Indeed, the lamp itself may wear out and be replaced without requiring a new reflector.

It is believed that the construction and method of use of my improved assembly, as well as the advantages thereof, will be apparent from the foregoing detailed description. It will also be apparent that while I have described the invention in a preferred form, changes may be made without departing from the scope of the invention as sought to be defined in the following claims.

I claim:

1. A jacketed reflective fluorescent lamp assembly, said assembly comprising a fluorescent lamp which may be of conventional construction including end pins for support of and electrical connection to the lamp, a glass cylinder of larger diameter around said lamp to jacket the same, said jacket being slightly shorter than said lamp, a sealing ring at each end of the lamp, said rings serving to close the ends of the jacket and to hold the jacket in coaxial relation with the lamp, and a reflective coating deposited on the inside of the jacket for part of the periphery of the jacket, whereby the jacket acts also as a reflector, said lamp and jacket being handled as a unit with the lamp serving as the support for the jacket.

2. A jacketed reflective fluorescent lamp assembly, said assembly comprising a fluorescent lamp which may be of conventional construction, a glass cylinder of larger diameter around said lamp to jacket the same, said jacket being slightly shorter than said lamp, sealing rings made of a yieldable resilient material having the characteristics of rubber, there being one such ring applied frictionally over each end of the lamp, said rings being annularly recessed to receive and close the ends of the jacket and to hold the jacket in coaxial relation with the lamp, and a reflective coating deposited on the inside of the jacket for part of the periphery of the jacket, whereby the jacket acts also as a reflector, said lamp and jacket being handled as a unit with the lamp serving as the support for the jacket.

3. A jacketed reflective fluorescent lamp assembly, said assembly comprising a fluorescent lamp which may be of conventional construction including end pins for support of and electrical connection to the lamp, a glass cylinder of larger diameter around said lamp to jacket the same, said jacket being slightly shorter than said lamp, sealing rings made of a yieldable resilient material having the characteristics of rubber, there being one such ring applied frictionally over each end of the lamp, said rings being annularly recessed to receive and close the ends of the jacket and to hold the jacket in coaxial relation with the lamp, and a reflective coating of white pigment deposited on the inside of the jacket for about half the periphery of the jacket, whereby the jacket acts also as a reflector, said lamp and jacket being handled as a unit with the lamp serving as the support for the jacket.

*4. A jacketed reflective fluorescent lamp assembly, said assembly comprising a fluorescent lamp which may be of conventional construction including end pins for support of and electrical connection to the lamp, a glass cylinder of larger diameter around said lamp to jacket the same, said jacket being slightly shorter than said lamp, a sealing ring at each end of the lamp, said rings serving to close the ends of the jacket and to hold the jacket in coaxial relation with the lamp, and a reflective material applied and adhered to the surface of the jacket for part of the periphery of the jacket, whereby the jacket acts also as a reflector, said lamp and jacket being handled as a unit with the lamp serving as the support for the jacket.*

*5. A jacketed reflective fluorescent lamp assembly, said assembly comprising a fluorescent lamp which may be of conventional construction, a glass cylinder of larger diameter around said lamp to jacket the same, said jacket being slightly shorter than said lamp, sealing rings made of a yieldable resilient material having the characteristics of rubber, there being one such ring applied frictionally over each end of the lamp, said rings being annularly recessed to receive and close the ends of the jacket and to hold the jacket in coaxial relation with the lamp, and a reflective material applied and adhered to the surface of the jacket for part of the periphery of the jacket, whereby the jacket acts also as a reflector, said lamp and jacket being handled as a unit with the lamp serving as the support for the jacket.*

References Cited by the Examiner

The following references, cited by the Examiner, are of record in the patented file of this patent or the original patent.

UNITED STATES PATENTS

| | | |
|---|---|---|
| 1,506,064 | 8/24 | Holland. |
| 2,308,986 | 1/43 | Livers. |
| 2,551,710 | 5/51 | Slaughter. |
| 2,849,598 | 8/58 | Lipscomb. |
| 2,887,567 | 3/59 | Dameral. |
| 3,047,716 | 7/62 | Hoxie et al. |

NORTON ANSHER, *Primary Examiner.*